US012559690B2

(12) United States Patent
Timko et al.

(10) Patent No.: US 12,559,690 B2
(45) Date of Patent: Feb. 24, 2026

(54) AUTO-THERMAL HYDROTHERMAL LIQUEFACTION OF WASTES

(71) Applicant: Worcester Polytechnic Institute, Worcester, MA (US)

(72) Inventors: Michael Timko, Arlington, MA (US); Alex R. Maag, Whitinsville, MA (US); Elizabeth Belden, Shrewsbury, MA (US); Geoffrey A Tompsett, Shrewsbury, MA (US); Andrew R. Teixeira, Boylston, MA (US); Aidin Panahi, Worcester, MA (US); Andrew Charlebois, Worcester, MA (US); Skyler Kauffman, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 217 days.

(21) Appl. No.: 18/540,345

(22) Filed: Dec. 14, 2023

(65) Prior Publication Data

US 2024/0218271 A1 Jul. 4, 2024

Related U.S. Application Data

(60) Provisional application No. 63/432,978, filed on Dec. 15, 2022.

(51) Int. Cl.
*C10G 69/06* (2006.01)
*C02F 11/06* (2006.01)
(Continued)

(52) U.S. Cl.
CPC .............. *C10G 69/06* (2013.01); *C02F 11/06* (2013.01); *C10B 53/02* (2013.01); *C10B 53/07* (2013.01);
(Continued)

(58) Field of Classification Search
None
See application file for complete search history.

(56) References Cited

U.S. PATENT DOCUMENTS 6,096,283 A * 8/2000 Cooper .................... G21F 9/06 210/759
6,402,940 B1 6/2002 Rappas
(Continued)

OTHER PUBLICATIONS

International Search Report, PCT/US2023/084077, pp. 1-3, May 13, 2024.

*Primary Examiner* — Tam M Nguyen
(74) *Attorney, Agent, or Firm* — Armis IP Law, LLC

(57) ABSTRACT

A waste stream of organic matter such as sewage, plant and plastic matter is received for recycling and treated with high temperature and pressure to generate useful organic products such as bio-oil and gas. Byproducts such as char and an aqueous phase including water can be selectively recycled or beingly discarded. An oxidant added to a reactor containing waste from the waste stream facilitates an autothermal reaction under the temperature and pressure applied to the reactor, boosting the temperature slightly from the reactions therein. The reactor generates useful hydrocarbons such as bio-oil resulting from disruption of organic bonds. A combination of oxidation and radical initiation results from the oxidant, and provides an increased yield of bio-oil while decreasing char when compared to temperature and pressure alone. A stoichiometric quantity of the oxidant limits complete conversion of carbon into carbon dioxide by limiting available oxygen and therefore favoring hydrocarbon formation.

20 Claims, 8 Drawing Sheets

(51) Int. Cl.
*C10B 53/00* (2006.01)
*C10B 53/02* (2006.01)
*C10B 53/07* (2006.01)

(52) U.S. Cl.
CPC . *C10G 2300/1003* (2013.01); *C10G 2300/80* (2013.01)

(56) References Cited

U.S. PATENT DOCUMENTS

| | | | | |
|---|---|---|---|---|
| 2003/0094400 | A1 | 5/2003 | Levy et al. | |
| 2005/0095183 | A1* | 5/2005 | Rehmat | C10K 3/006 422/600 |
| 2008/0099379 | A1 | 5/2008 | Ramamurthy | |
| 2010/0282644 | A1 | 11/2010 | O'Connor et al. | |
| 2012/0017492 | A1* | 1/2012 | Ramirez Corredores | C10L 1/02 44/307 |
| 2016/0114307 | A1* | 4/2016 | Downie | B01J 8/00 252/182.31 |
| 2018/0066192 | A1 | 3/2018 | Bartek et al. | |
| 2021/0403813 | A1* | 12/2021 | Gutierrez | C10G 51/023 |
| 2025/0297177 | A1* | 9/2025 | Mannel | C10G 1/10 |

* cited by examiner

AUTO-THERMAL HYDROTHERMAL LIQUEFACTION OF WASTES

RELATED APPLICATIONS

This patent application claims the benefit under 35 U.S.C. § 119(e) of U.S. Provisional Patent App. No. 63/432,978, filed Dec. 15, 2022, entitled "AUTOTHERMAL HYDROTHERMAL LIQUEFACTION OF WASTES," incorporated herein by reference in entirety.

STATEMENT REGARDING FEDERALLY SPONSORED RESEARCH AND DEVELOPMENT

This invention was developed, at least in part, with U.S. Government support under contract No. DE-EE0009507, awarded by the Department of Energy and National Science Foundation, Graduate Research Fellowship Program award number 2038257. The Government has certain rights in the invention.

BACKGROUND

Wastes contribute disproportionately to many of the environmental problems of the 21st century, from runoff of waste fertilizers causing harmful algae blooms, to plastics clogging our waterways, to landfill gases contributing to global climate change. Converting waste into useful products gives waste a market, making it less likely to burden the environment. Conventional approaches to recycling of organic waste often involve extreme temperature and pressure conditions, which leads to high up-front costs and co-generation of solid byproducts with low value. Further, different feeds react at distinctly different temperatures, meaning that not all feeds can be processed simultaneously.

SUMMARY

A waste stream of organic matter such as sewage, plant and plastic matter is received for recycling and treated with high temperature and pressure to generate useful organic products such as bio-oil and gas. Byproducts such as char and an aqueous phase including water can be selectively recycled or beingly discarded. An oxidant added to a reactor containing waste from the waste stream facilitates an auto-thermal reaction under the temperature and pressure applied to the reactor, boosting the temperature slightly from the reactions therein; providing a source of highly reactive radicals; and partially oxidizing the feed, making it more reactive. The reactor generates useful hydrocarbons such as oil (so-called "biocrude" or "bio-oil") resulting from disruption of carbon-carbon and carbon-hydrogen bonds present in macromolecules that reassemble into smaller molecules. A combination of exothermic reaction, partial oxidation, and radical initiation results from the oxidant, and provides an increased yield of bio-oil while decreasing char when compared to liquefaction based only on temperature and pressure. A sub-stoichiometric quantity of the oxidant limits complete conversion of carbon into carbon dioxide by limiting available oxygen and therefore favoring hydrocarbon formation.

Configurations herein are based, in part, on the observation that fossil fuel alternatives are appealing for renewability and reduced environmental impact. Unfortunately, conventional approaches to alternative fuels suffer from the shortcoming of cost and energy demands with production of alternatives such as plant based and waste based recycling, limiting yield and profitability. Accordingly, configurations herein substantially improve production of organic products such as bio-oil/biocrude and gas by adding an oxidant for balancing carbon dioxide generation by regulating the available oxygen added via the oxidant. The added oxidant is based on a stoichiometric measure of carbon and oxygen available for carbon dioxide production, and limiting the available oxygen to drive the carbon to react with the organic waste. The oxidant, such as hydrogen peroxide, therefore relies on the carbon present in the quantity of organic waste.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The description below presents an example of methods for auto-thermal hydrothermal liquefaction (AT-HTL) technology which greatly increases the yields of desirable products that are obtained from thermal treatment of wastes under pressure. The examples described herein apply the AT-HTL approach to food waste, several different types of plastics, waste product of paper making and biorefining (lignin), and sewage sludge. Much greater yields of energy dense liquids or sometimes solids with favorable properties are obtained using AT-HTL. Conventional approaches generally include heating up a wet organic stream to 280°-400° C. at pressures greater than 10 MPa for 1-120 min. At these conditions, components in the waste stream breakdown into small organic molecules, which then re-assemble into an energy dense biocrude. The disclosed approach improves production yields by addition of oxidant at sub-stoichiometric levels, where "stoichiometric" refers to the amount of oxygen required for complete conversion of carbon present in the feed to carbon dioxide. Herein, the term "oxidant" refers both to oxidizing agents as well as radical initiators. Radical initiators that are not oxidants; oxidants that are not radical initiators; and substances that are both oxidants and radical initiators have been tested and each has been found effective. Hydrogen peroxide, which is both an oxidant and a radical source and which leaves no carbon byproducts, may be preferred in some applications.

Instead of carbon dioxide generation, in configurations herein, the sub-stoichiometric oxidant allows incomplete reaction with the organic waste, greatly increasing the reaction rates obtained from conventional approaches such as hydrothermal liquefaction (HTL). Part of the benefit over conventional approaches is rapid and volumetric release of heat from the reaction of oxidant with organic waste, thereby minimizing the time spent by the organic waste in the temperature range associated with formation of solid char. This autothermal mechanism explains the reduction of char observed for AT-HTL of food waste and sewage sludge. Interestingly, the reacted carbon might be considered sacrificial. However, biocrude yields obtained from AT-HTL are superior to conventional approaches, hence the sacrifice of some of the carbon contained in the organic waste does not detract from yields. In other instances, especially for thermally stable plastics, AT-HTL increases reactivity to the point that complete plastic conversion can be obtained even at temperature conditions at which conventional approaches would lead to <1% conversion. In such examples, described further below, thermal effects alone cannot achieve such performance, indicating that the reaction with the oxidant releases highly reactive radicals in the reaction mixture; these radicals then promote and propagate reactions at which the polymer itself would otherwise be stable.

Figure 1:
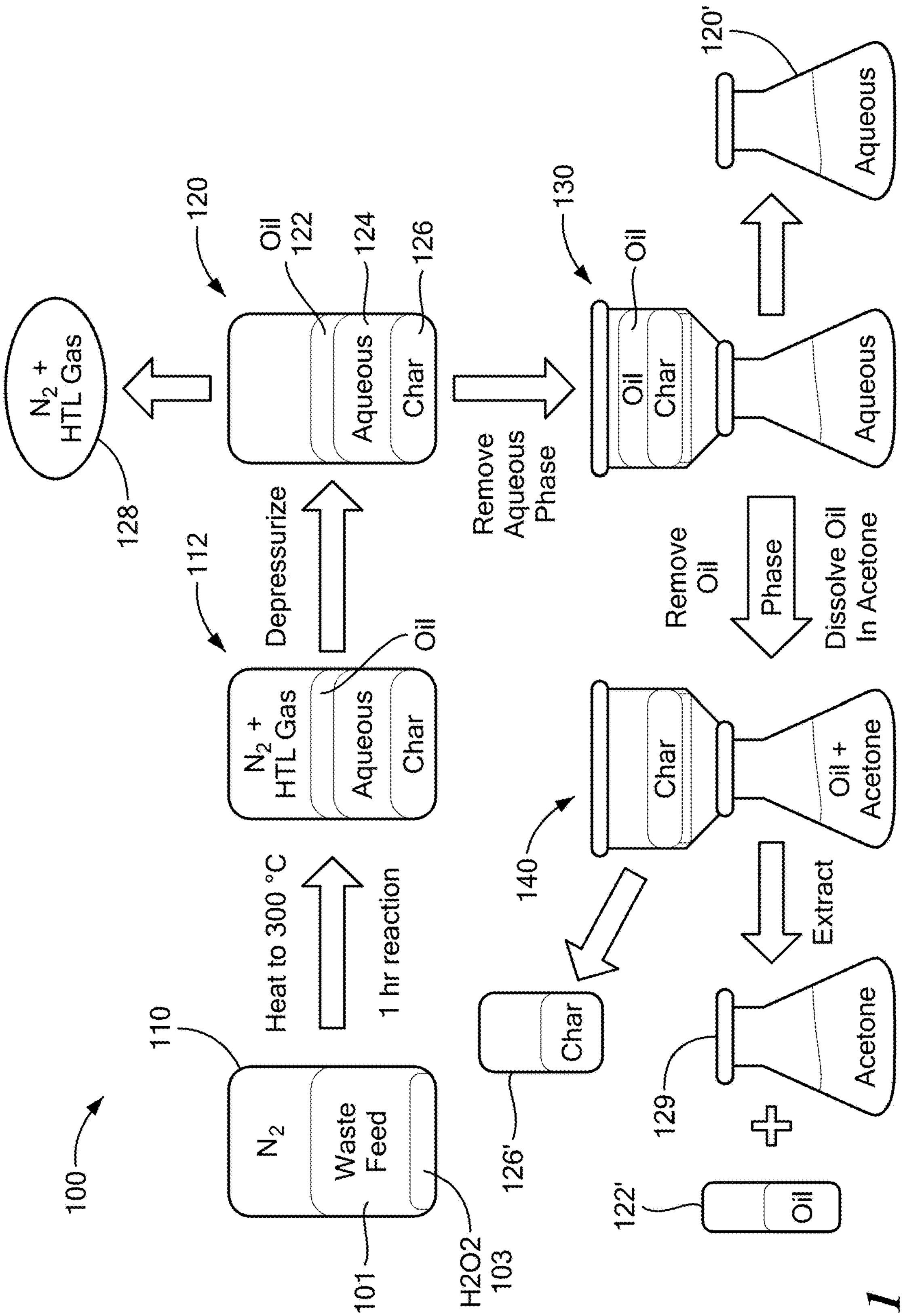
FIG. 1 is a context diagram of organic waste recycling as disclosed herein.

FIG. 1 is a context diagram of organic waste recycling as disclosed herein. Referring to FIG. 1, a process flow 100 of a method for obtaining useful organic products from a waste stream 101 is shown. An oxidant 103 such as $H_2O_2$ (see above) is added to the waste stream in a containment 110 or similar closed reactor adapted to pressure increases. The waste stream is heated under pressure to obtain organic products including an oil 122, a gas 128, an aqueous mixture of oil and water 124, and char 126. Harvesting the organic products (products) includes extracting the oil, filtering the char, and removing the aqueous mixture.

The aqueous phase separates by sieving, filtering or draining, as depicted at step 130 to yield the separated aqueous phase 120'. This includes water with varied organic compounds. The solid char 126 can easily be separated from the oil by washing or dissolving in acetone to separate oil from char, at step 140, and the recovered char 126' discarded as waste or passed to specific recycling channels. Harvested oil 122' is similar to fossil fuel crude oil, but can have up to 10% oxygen content (around 5%-10%). Recovered acetone 129 can be reused in successive iterations passed through the containment 110.

As discussed above, the oxidant 103, such as hydrogen peroxide, introduces a specific oxygen quantity to balance generation of useful hydrocarbons with carbon dioxide production. The oxidant is adding the containment 110 at a sub-stoichiometric amount, based on a stoichiometric ratio of oxygen in the oxidant and carbon in the waste stream, thereby limiting production of carbon dioxide.

The oxidant quantity varies with the feedstock in the recycling stream, and involves determining a stoichiometric amount of oxygen for forming carbon dioxide with the carbon in the waste stream. By computing an oxygen quantity less than the determined stoichiometric amount, oxygen available for carbon dioxide production is limited. The oxidant in them added in the determining stoichiometric amount for achieving the computed oxygen quantity.

A further result or enhancement resulting from heating the waste stream is to cause or induce an autothermal reaction, such that the autothermal reaction results in a volumetric release of heat based on the reaction of the oxidant with the waste stream for increasing the heat. In practice, the heat of the containment 110 will be seen as a rapid "burst" of temperature increase; not as a replacement for external heating, but as a chemically generated exothermic reaction occurring in the containment.

Selection of oxidant may be optimized for economic or operational considerations. In the example use cases depicted below, hydrogen peroxide is employed as an effective oxidant, being as a green, safe, and generally available substance. Oxygen, preferably directly from air, may be a less expensive oxidant that retains the effectiveness of hydrogen peroxide. On the other hand, organo hydroperoxides—with chemical formulas of the type R—O—O—R (R is an organic) and which are less stable and more expensive than hydrogen peroxide—may have reactivity advantages that make them preferred for some applications. Tert-butyl hydroperoxide is an example of this chemical family. Any suitable oxidant capable of achieving the desired sub stoichiometric level may be employed.

Figure 2:
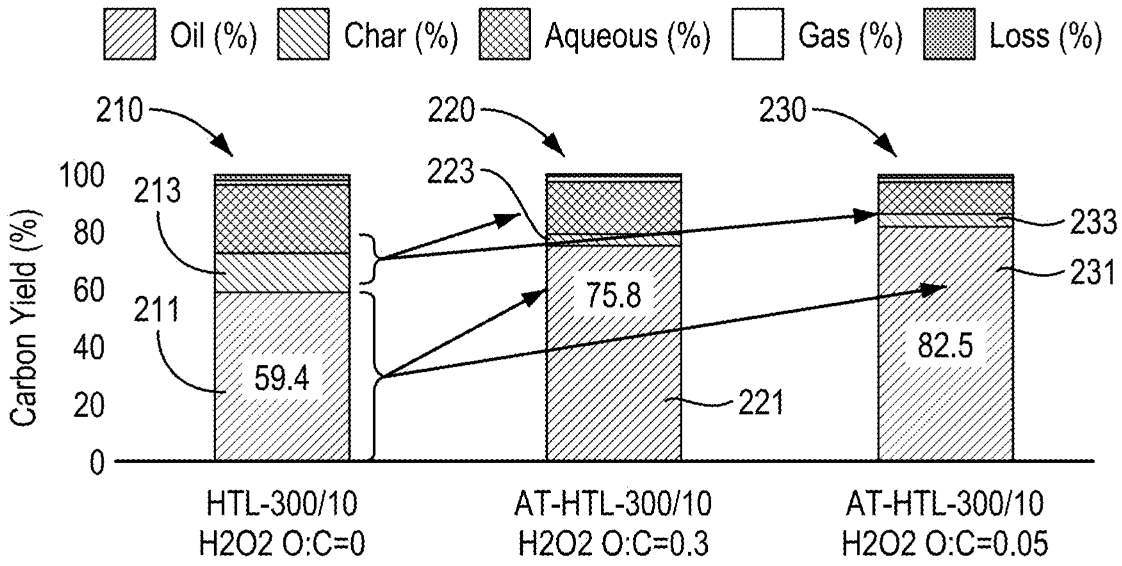
FIG. 2 is a graph of the improvement of the disclosed approach over hydrothermal liquefaction (HTL)

FIG. 2 is a graph of the improvement of the disclosed approach over hydrothermal liquefaction (HTL). A basic HTL process alone can achieve beneficial results, however the disclosed approach offers significant advantages, particularly with bio-oil yield, and with certain waste inputs such as carbon-rich sewage sludge (SS). Even basic HTL offers great advantages over combustion and pyrolysis, which avoids the demand for energy-intensive drying. HTL is an effective method for treatment of SS with high moisture. Extending this, the disclosed approach has the ability to convert various types of waste to biocrude, which is comparable to fossil crude oil and can be upgraded in existing refinery equipment configurations. Scaling this approach up to a production level is a capital-intensive process and maximizing biocrude yield is a significant aspect of economic viability.

In FIG. 2, three trials 210, 220 and 230 demonstrate the advantages of the disclosed approach. A basic HTL approach 210, heating to 300° C. for 10 minutes at high pressure (10-35 MPa) has a bio-crude yield 211 of 59.4 and a char 213 yield of around 14%. However, liquefaction was improved by adding an oxidant ($H_2O_2$) into the reactor to initiate depolymerization and liquefaction of complex organic wastes into useful fuel and chemicals precursors, maximizing conversion, and minimizing co-production of low-value solids. This method increased the biocrude yields and minimized the char yields. When the oxidant is added at a sub-stoichiometric ratio of O:C of 0.3 220, the bio-oil yield 221 increases to 75.8% and char 223 is reduced to 4%. Even greater improvements are shown with an O:C ratio of 0.05 at 230 for corresponding bio-oil 231 and char 233 yields. Other differences with the aqueous/water and gas yields are also shown.

Once extracted and/or generated, the bio-oil/biocrude may be upgraded by hydrodeoxygenation. Hydrodeoxygenation is a hydrogenolysis process for removing oxygen from oxygen-containing compounds. A major distinction between bio-oil and fossil fuel is oxygen content, which can be as high as 10%, hence the removal of oxygen brings the bio-oil more aligned with fossil fuel crude oil.

In general, the disclosed approach converts organic wet wastes into a fuel precursor as bio-crude. This conversion is compatible with wet wastes without drying and can be applied to food waste, sewage sludge, biomass waste and many other forms of waste. A typical iteration involves heating the containment to between 250° C.-400° C. and maintaining the pressure between 10-35 MPa. This is a more rapid process than anaerobic digestion and it produces a more valuable liquid product compared with biogas generation.

Table I shows chemical composition of expected feedstocks. A typical waste stream includes bio waste, meaning non-edible plant matter, sewage sludge, plastics, green waste and food waste, all having ample sources of carbon for the generation of bio-oil and other organic products.

Chemical Composition of Candidate Feedstocks:

TABLE I

| | Sewage Sludge | Plastics | Green Waste | Food Waste |
|---|---|---|---|---|
| C | 53.6 | 93.63 | 42.2 | 52.2 |
| H | 7.3 | 6.36 | 5.2 | 7.5 |
| N | 6.9 | — | 0.2 | 4.3 |
| S | 1.16 | — | 0.7 | 1 |
| O | 34.6 | — | 52 | 33.2 |

The disclosed AT-HTL approach can be optimized by adjusting the reaction temperature, reaction time, solids loading of organic waste, and amount and possibly type of oxidant. The general strategy is to tune the severity of the conditions, including the amount of oxidant, to the reactivity of the organic waste. For example, food waste is generally regarded as highly reactive under HTL conditions. We find complete conversion and optimal biocrude yields for food waste at 300° C. Polyethylene, which is generally regarded as unreactive under HTL conditions, requires 400° C. for complete reactions under AT-HTL conditions. Polystyrene, which has reactivity intermediate to food waste and polyethylene, requires reaction conditions intermediate to these two waste streams. Lastly, it should be noted that AT-HTL compresses the reactivity window of different feeds, with potential benefits for co-processing of mixed waste feeds. Co-processing mixed feeds has the benefit of eliminating the need for pre-reaction separations, thereby reducing overall process costs.

Figure 3:
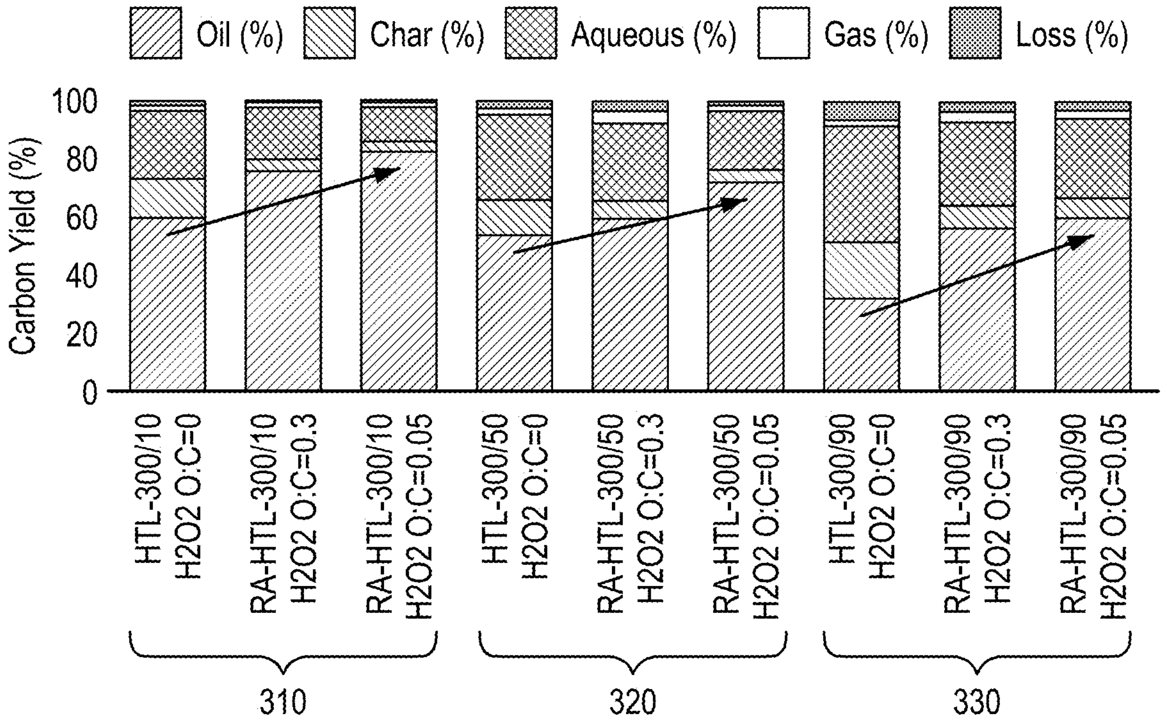
FIG. 3 is a graph of the autothermal approach herein employing an oxidant with a waste stream of sewage sludge.

FIG. 3 is a graph of the autothermal approach herein employing an oxidant with a waste stream of SS for trials 310, 320 and 330 of 10 min., 50 min. and 90 min., respectively at 300° C. SS is a byproduct of wastewater treatment. It is normally a mix of organic matter from human waste, food waste particles, microorganisms, trace chemicals and inorganic solids from consumer products and medicine, together with water bound to these materials. In an example configuration, the waste stream includes sewage sludge resulting from municipal waste byproducts having greater than 50% carbon. SS has become a critical problem due to its environmental risk and high treatment/disposal cost.

TABLE II

| Product Distribution (wt %) from AT-HTL of Sewage Sludge | | | | |
|---|---|---|---|---|
| Reaction Condition | Oil + Aqueous | Char + Ash | Gas | Loss |
| HTL (300° C.) | 75.1 ± 0.9 | 18.7 ± 0.6 | 3.1 ± 0.02 | 3.2 ± 0.3 |
| AT-HTL (300° C.) | 87.1 ± 3.6 | 3.2 ± 0.6 | 13.4 ± 0.0 | −3.8 ± 3.0 |

TABLE II-continued

| Product Distribution (wt %) from AT-HTL of Sewage Sludge | | | | |
|---|---|---|---|---|
| Reaction Condition | Oil + Aqueous | Char + Ash | Gas | Loss |
| HTL (325° C.) | 73.7 ± 1.2 | 8.4 ± 0.4 | 3.8 ± 0 | 14.1 ± 0.8 |
| AT-HTL (325° C.) | 77.6 ± 0.8 | 6.4 ± 0.1 | 15.2 ± 1.8 | 0.7 ± 2.5 |

In each time bracket 310, 320, and 330, a first trial (leftmost) employs no oxidant. The second (middle) trial has an oxidant (O:C) ratios of 0.3, and the third (rightmost) trial has an O:C ratio of 0.05 (demonstrate an impact of the oxidant on the biocrude yields, showing consistently higher bio-crude yields as the sub-stoichiometric oxidant ratio provides less oxygen, effectively "starving" production of $CO_2$ and favoring bio-oil generation. The oxidant ratio of 0.3 and 0.05 effectively limit the oxygen to about 30% and 5%, respectively, of the oxygen needed for complete $CO_2$ conversion. This figure indicates that nearly 80% of the carbon can be converted to biocrude by use of modified HTL. The arrow emphasize the benefit of $H_2O_2$ (oxidant) addition. Other oxidants based on similar stoichiometric values effect similar results. Table II a shows percentage breakdown of the results.

A general trend is an increase in bio-oil yield based on the sub-stoichiometric level of the oxidant. Under the pressure and temperature in the reactor, the result indicate that heating causes at least one of oxidation and radical initiation, where radical initiation is based on free radicals formed from the heating and pressure in a containment around the waste stream. Therefore, an effect of the oxidant is to form free radicals resulting from the heat and pressure applied to a containment of the waste stream for radical initiation. Thus, the oxidant contributes oxygen to reactions resulting in hydrocarbon chains. One effect of the oxidant is adding or introducing free radicals for forming weak positions in hydrocarbon chains and forming short chained oxygenated molecules. Although hydrogen peroxide is employed as an example oxidant, the oxidant may include at least one selected from: hydrogen peroxide, perchloric acid, sodium perchlorate, and an organic hydroperoxide.

By way of background, a radical, or free radical, is an unstable molecule having an unpaired valence electron. A notable example of a free radical is the hydroxyl radical (HO), a molecule that is one hydrogen atom short of a water molecule and thus has one bond "dangling" from the oxygen. Two other examples are the carbene molecule ($CH_2$), which has two dangling bonds; and the superoxide anion (·O-2), the oxygen molecule $O_2$ with one extra electron, which has one dangling bond. In contrast, the hydroxyl anion (HO—), the oxide anion ($O^{2-}$) and the carbenium cation ($CH^{+3}$) are not radicals, since the bonds that may appear to be dangling are in fact resolved by the addition or removal of electrons. The autothermal effect (AT) described above is attributed to such radical initiation (RI).

Figure 4:
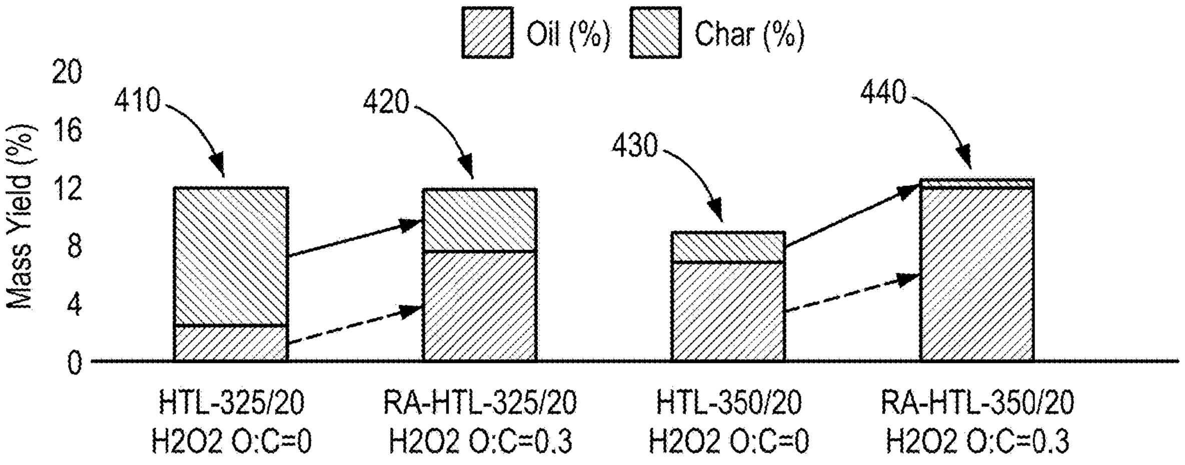
FIG. 4 is a graph of the autothermal approach with plastic solid waste.

FIG. 4 is a graph of the autothermal, radical initiated approach with plastic solid waste. Plastic solid waste (PSW), is the accumulation of plastic objects in the Earth's environment that adversely affects wildlife, wildlife habitat, and humans. Trials involving PSW were carried out at different temperatures of 325° C. and 350° C. with and without oxidant at 20 min. Oxidant (O:C) ratio of 0.3 was selected to study the impact of the new method on the biocrude yields. Modest biocrude (bio-oil) yields in an absence of an oxidant are observed at trial 410, slightly improved at a temperature of 350° C. at 430. An O:C oxidant ratio of 0.3 shows substantial improvement at only 325° C. (420), even more so at 350° C. in trial 440. In general, a temperature increase to 350° C. and 400° C. is particularly beneficial with plastics having a high carbon content. Reduction of char is also achieved with greater bio-oil yield. In a typical scenario, the waste stream includes polyethylene, polystyrene, and polypropylene.

Figure 5:
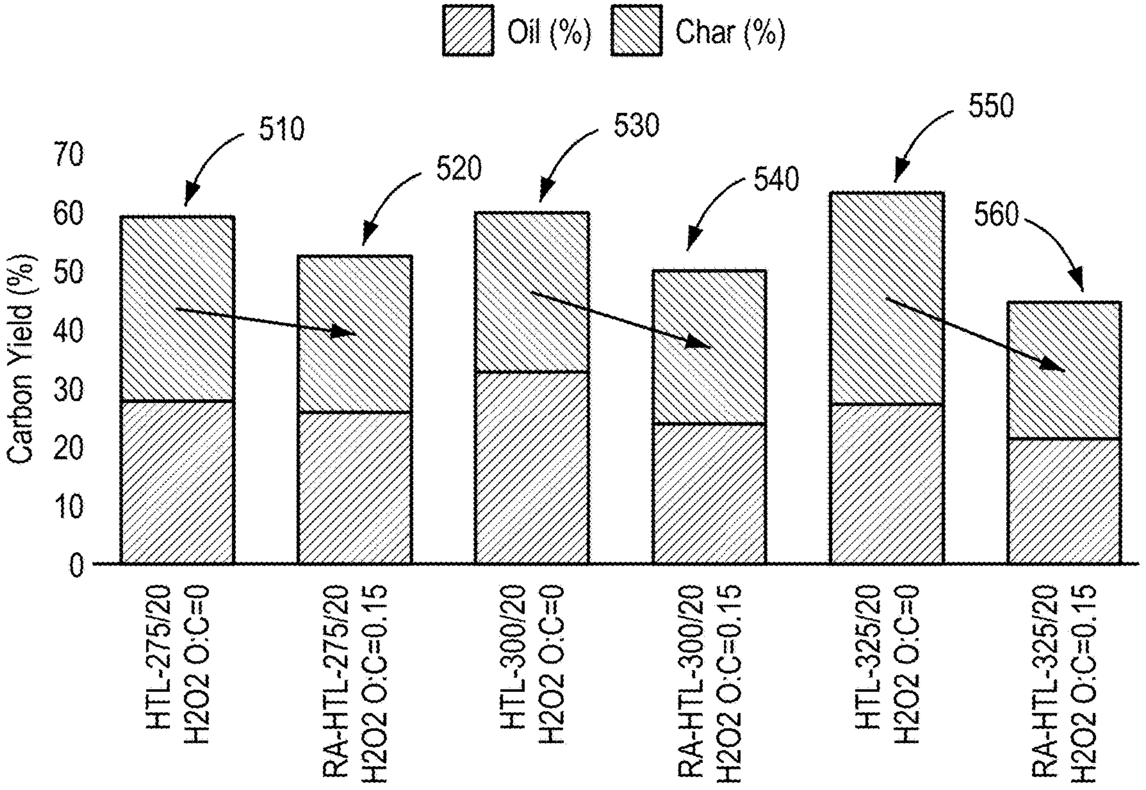
FIG. 5 is a graph of recycling green waste using the approach of FIGS. 1-4.

FIG. 5 is a graph of recycling green waste using the approach of FIGS. 1-4. Green waste (GW) is generally defined as biodegradable waste generated from garden waste such as grass clippings, trimmings, old stumps, tree branches, twigs, leaves, flowers, weeds and unwanted indoor plants, and not food consumables. Experiment trials using GW were carried out at different temperatures of 275° C., 300° C. and 325° C. with and without oxidant at 20 min. Oxidant (O:C) ratio of 0.15 was selected to study the impact of the new method on the biocrude yields.

Referring to FIG. 5, the oxidant based trials 520, 540 and 560 indicate around a 35% reduction in char with minimal degradation on oil generation at the various temperatures. Non-oxidant trials 510, 530 and 550 all have substantially greater char generation.

Figure 6:
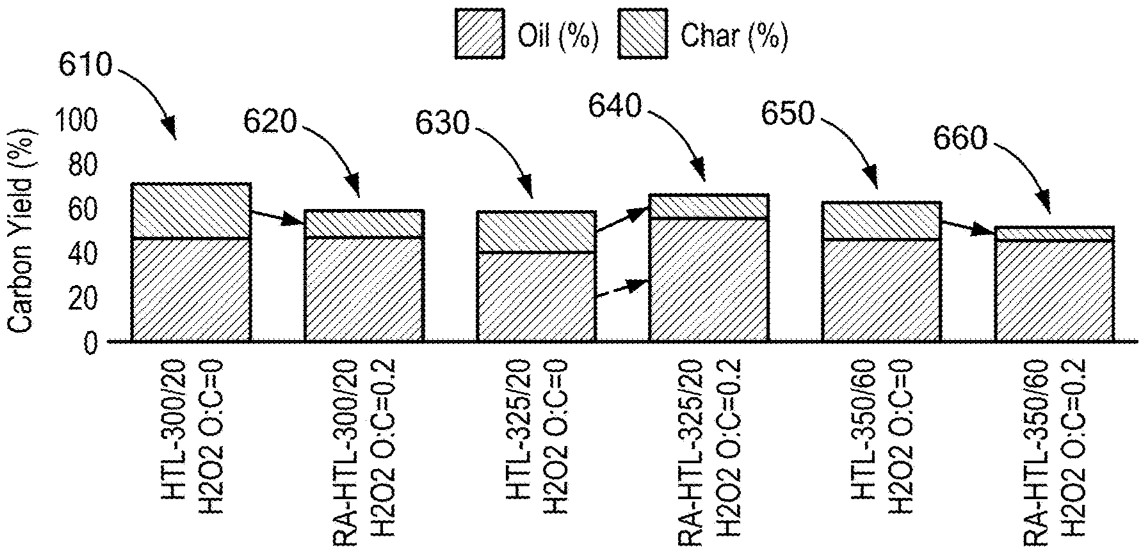
FIG. 6 is a graph of recycling food waste using the approach of FIGS. 1-5.

FIG. 6 is a graph of recycling food waste using the approach of FIGS. 1-5. The food waste (FW) mainly consists of organic waste from various sources including field waste, processing plants, kitchens and restaurants. Available research forecasts the amount of food wasted in a year will rise by one-third by 2030. For food waste, experiments were carried out at different temperatures of 300° C., 325° C., 350° C. with and without oxidant at different reaction times (20 min and 60 min). Oxidant (O:C) ratio of 0.2 was selected to study the impact of the new method on the biocrude yields. Referring to FIG. 6, the biocrude yields obtained from the trials 610-660 indicate that nearly 45% of the carbon can be converted to biocrude by use of an oxidant. A particularly large yield is demonstrated by a 325° C. reaction temperature for 20 minutes (640) using an O:C oxidant ratio of 0.2 (20%).

The above experiments indicate that an enhanced hydrothermal liquefaction approach maximizes biocrude yields and minimizing co-production of low-value solids. This method was applied to different sources of waste including sewage sludge, plastic solid waste, green waste and food waste. Different operating conditions applied to the various demonstrated configurations, and corresponding varied promotion of biocrude yields and reduction of char yields were observed. Adjustment of the oxidant amount for achieving a sub-stoichiometric ratio varies based on the carbon content of the input feedstock. In the particularly noteworthy case of sewage sludge, configurations herein resulted in about a 40% increase in bio-crude yields increased while solid yields decreased around 70%.

Figure 7:
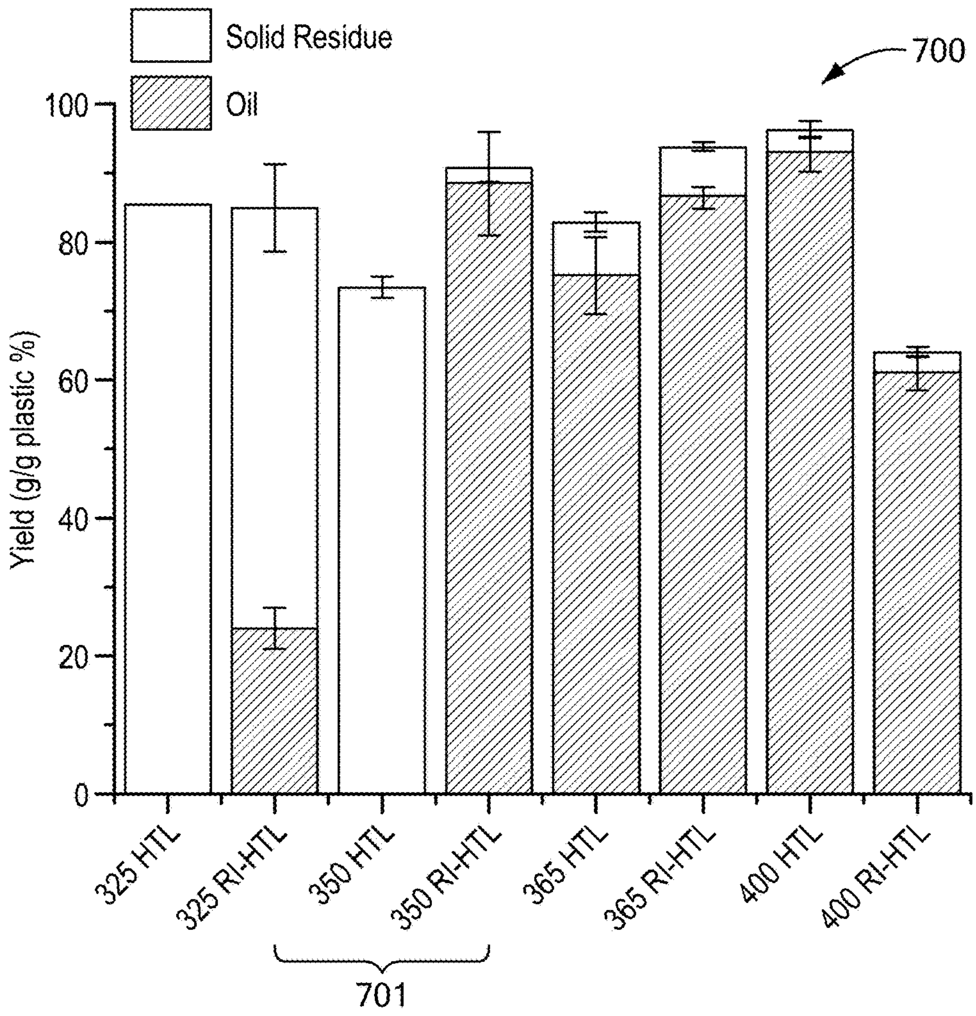
FIG. 7 shows a graph of oil yield of radical initiated hydrothermal liquefaction (RI-HTL)

FIG. 7 shows a graph 700 of oil yield of radical initiated hydrothermal liquefaction (RI-HTL). In FIG. 7, each reaction depicts a 20 minute reaction time with 3:1 peroxide loading. A particular noteworthy comparison occurs at 701, where at 350° C., RI-HTL conditions boost oil yield from <1% to >85%. The other trials illustrate that substantially greater oil yields occur, even at lower temperatures, with the AT/RI approach.

Figure 8:
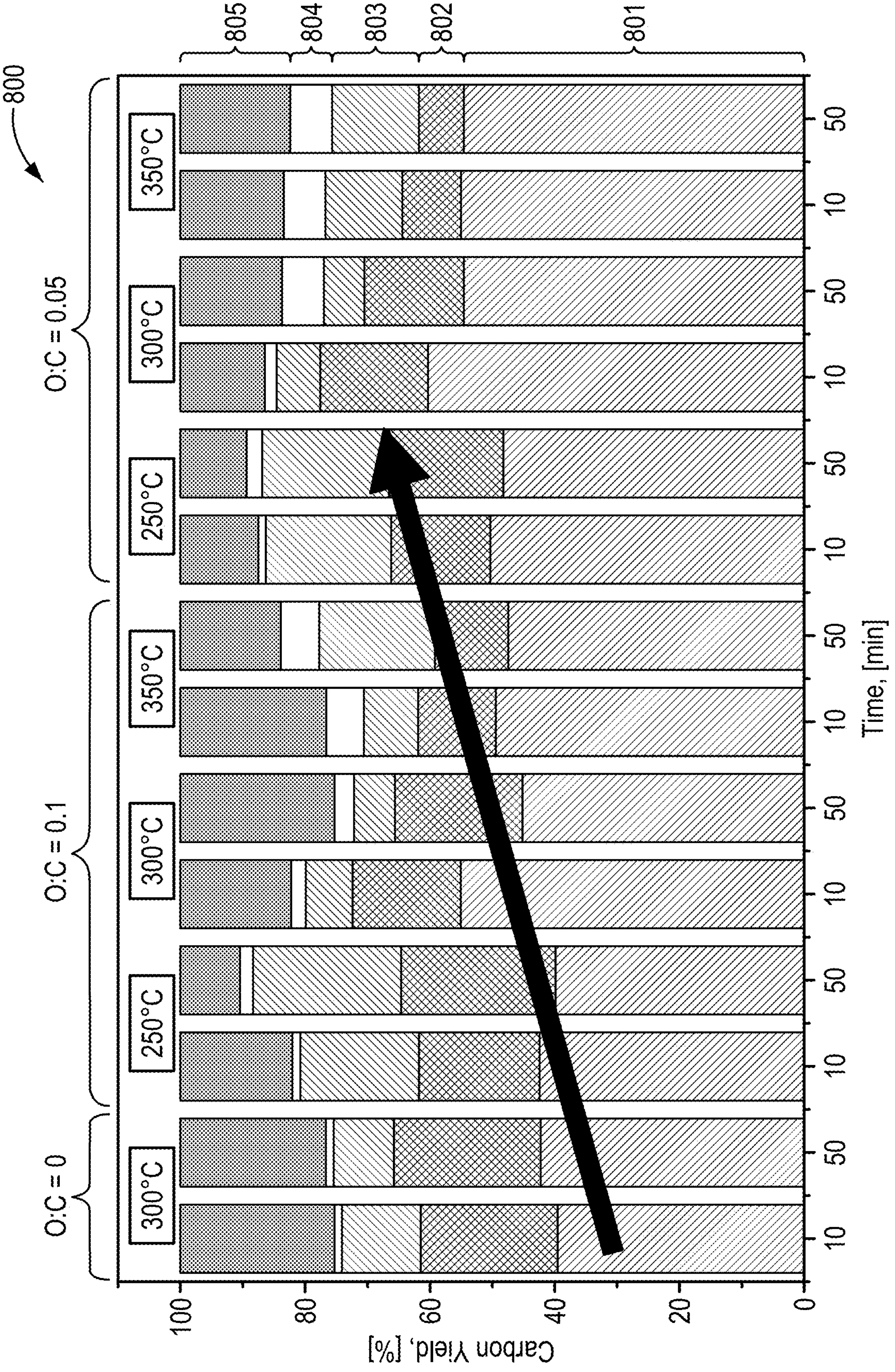
FIG. 8 shows a use case of the disclosed approach with sewage sludge.

FIG. 8 shows a use case 800 of the disclosed approach with sewage sludge. Addition of $H_2O_2$ demonstrates a biocrude increase of around 50% and a char decrease of around 50%. Oil 801 yield steadily increases with temperature and a sub-stoichiometric starvation of oxygen towards 0.05. An aqueous component 802 varies, while char 803 is minimized with particular combinations of time and temperature. Gas 804 production is rather consistent, while loss 805 tends to decrease with increased oil 801 yield.

Figure 9:
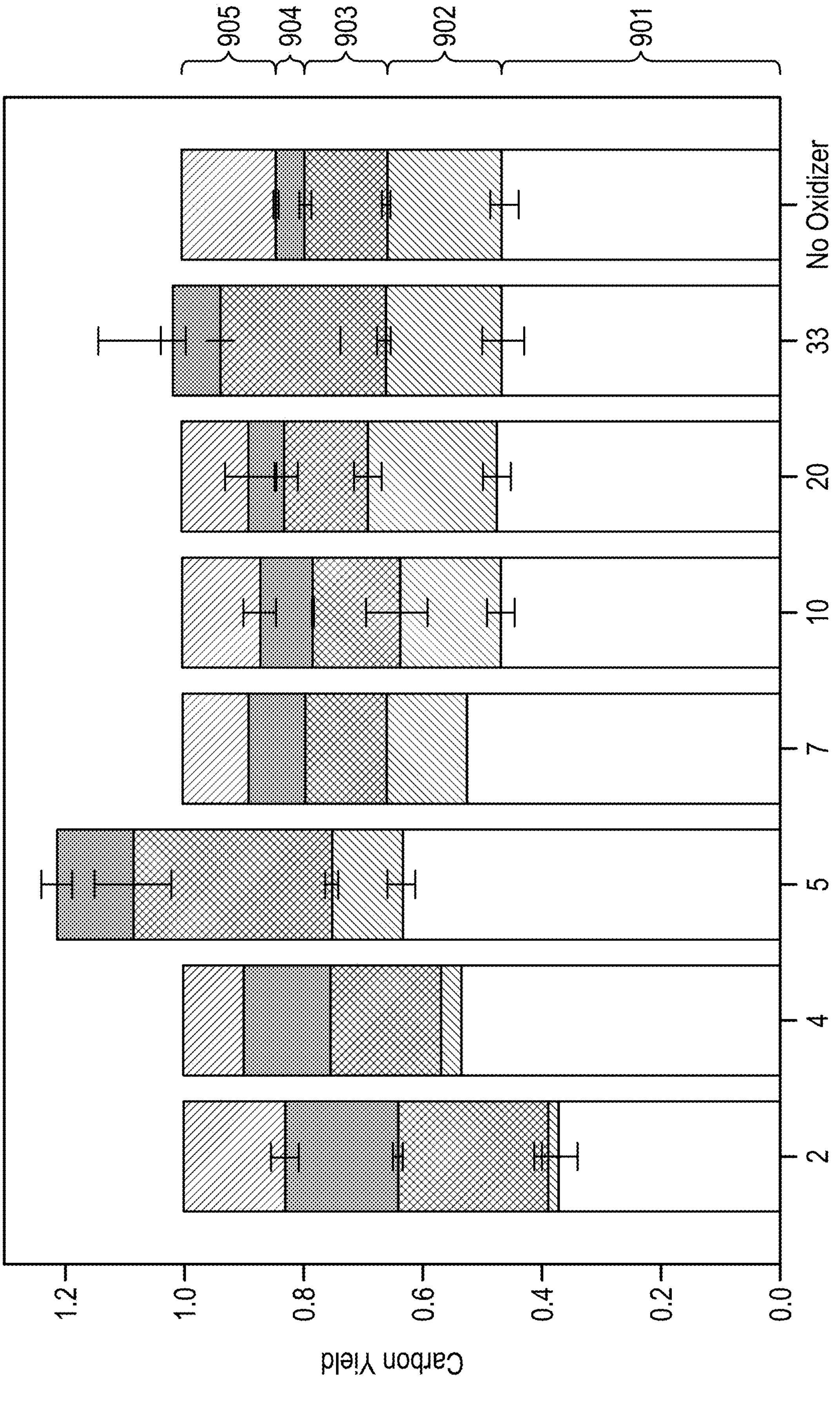
FIG. 9 shows another use case of the disclosed approach with food waste.

FIG. 9 shows another use case of the disclosed approach with food waste. A food waste trial 900 maintained reactor Conditions of:

T=325° C.

t=20 min

C:O ratio=2, 4, 5, 7, 10, 20, 33

Solids Loading=15%.

Biocrude 901 yield increases from 43% to 62% at optimal conditions with a C:O ratio of 5, while solids 902 generally decreased with increased oil yield. Aqueous 903 and gas 904 yields were varied, while loss 905, as with the sewage sludge of FIG. 8, was generally inverse to oil production.

The general trend of increased oil production with the RI/AT sub-stoichiometric approach is attributed to several mechanisms. 1) Oxidation—effectiveness of $H_2O_2$ compared with an equivalent number of moles of oxygen. 2) Thermal—temperature gain attributable to $H_2O_2$. And 3) Radical—quantification of radical pathways.

Figure 10:
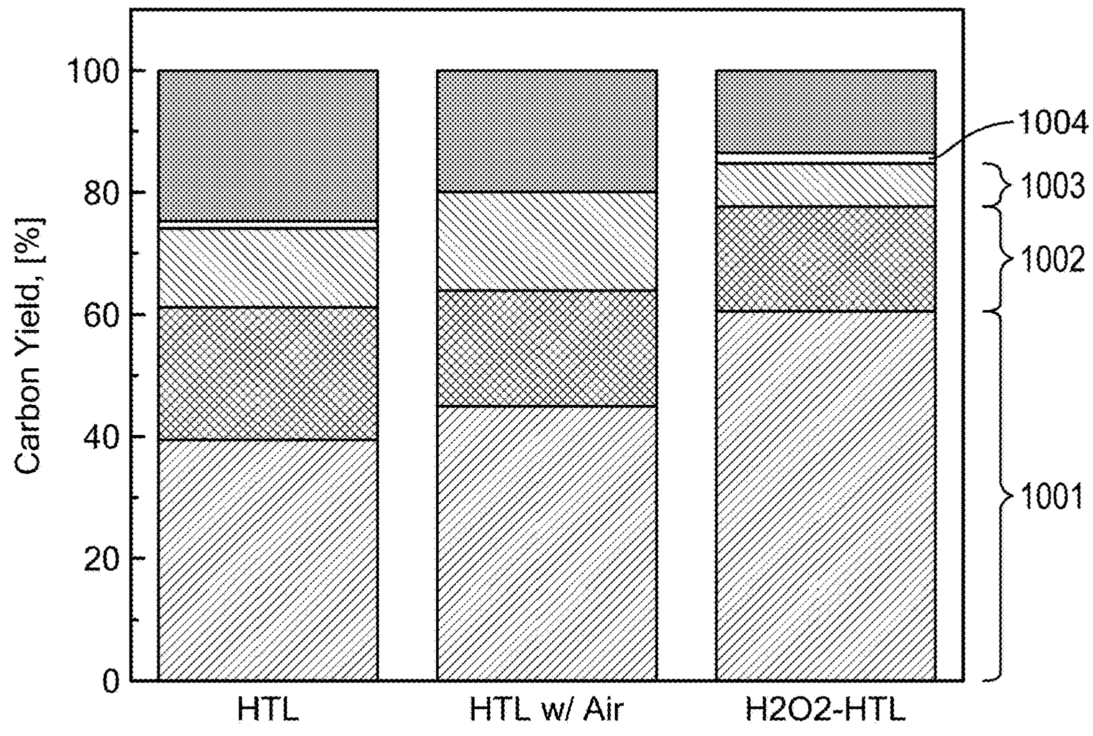
FIG. 10 is a graph of oxidative effects towards the bio-oil yield.

FIG. 10 is a graph of oxidative effects towards the bio-oil yield. In FIG. 10, the reactor is charged with stoichiometric $O_2$, and the general increase of carbon yield across oil 1001, aqueous phase 1002, char 1003 and gas 1004 suggests that oxygen alone cannot explain the beneficial yields. $H_2O_2$ must affect yields through other means.

In the case of sewage sludge, for example:

The $H_2O_2$ can decompose, in an exothermic reaction $$H_2O_2 \longrightarrow H_2O + \tfrac{1}{2}O_2 + \text{heat}$$

The carbon in the sewage sludge can be oxidized, also in an exothermic reaction, combined, these reactions potentially contribute to $$C + O_2 \longrightarrow CO_2 + \text{heat}$$

The $H_2O_2$ can interact with metal ions, mainly iron, in the system causing the formation of radicals $$Fe^{2+} + H_2O_2 \longrightarrow Fe^{3+} + OH^{-} + HO.$$

Figure 11:
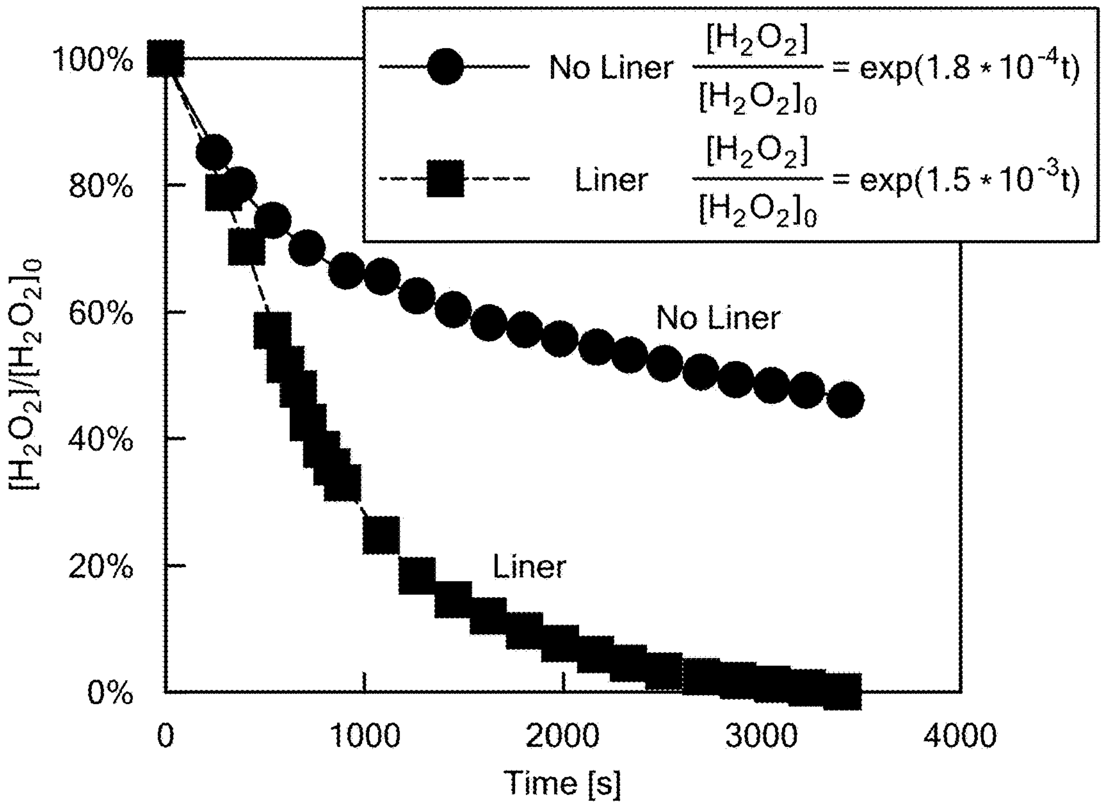
FIG. 11 shows the results of a catalytic wall trial.

A glass liner trial was conducted, by adding a glass liner to parr reactor will inhibit hydrogen peroxide interactions with the wall of the reactor, leading to increased rate of oxygen evolution. FIG. 11 shows the results of a catalytic wall trial. The conclusion is that use of a liner suppresses wall-catalyzed reaction, promotes oxygen evolution. This suggests the possibility of a radical initiation reaction being catalyzed by the wall surface.

An exothermic effect would follow a hypothesis that high temperature injections of $H_2O_2$ will lead to an increase in temperature from the exothermic reactions taking place. Under reactor conditions of:

Pressurized with $N_2$ $P_0$=200 PSI $P_{rxn}$=1250 PSI

T=300

With Reactor Contents:

Sewage Sludge $H_2O_2$, injected at 295° C.

$$\text{Decomposition: } H_2O_2 \rightarrow H_2O + \frac{1}{2}O_2$$

$$\Delta H_{rxn} = -98.2\ \frac{kJ}{\text{mol}}$$

$$\text{Oxidation: } C + O_2 \rightarrow CO_2$$

$$\Delta H_{rxn} = -393\ \frac{kJ}{\text{mol}}$$

Figure 12A:
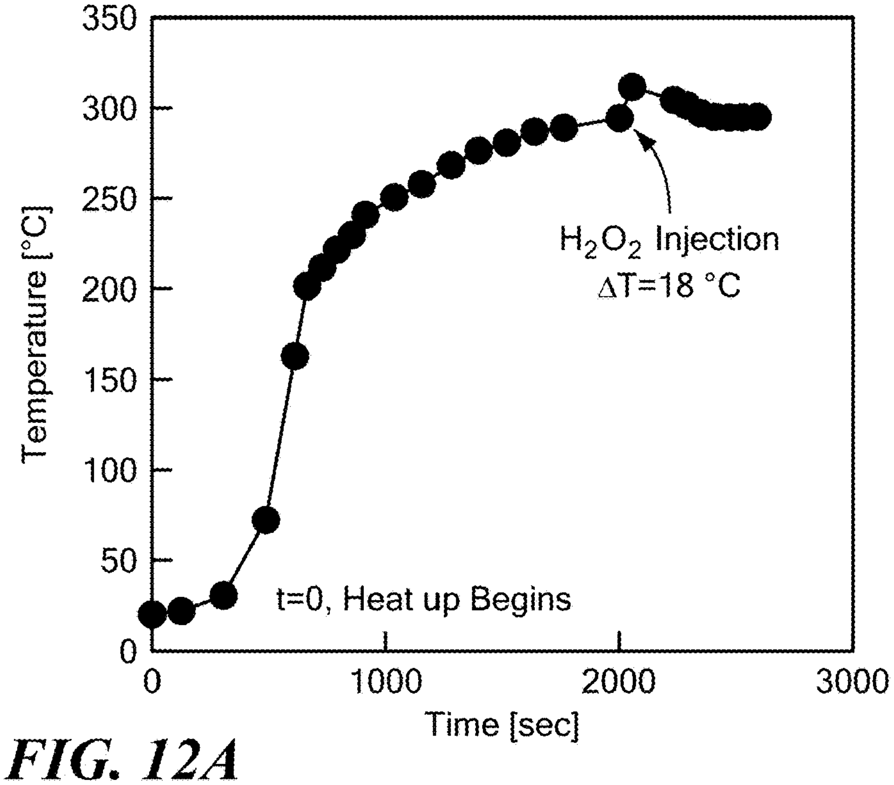
FIGS. 12A and 12B show temperature profiles of experimental conditions of the effect of the oxidant $H_2O_2$.
Figure 12B:
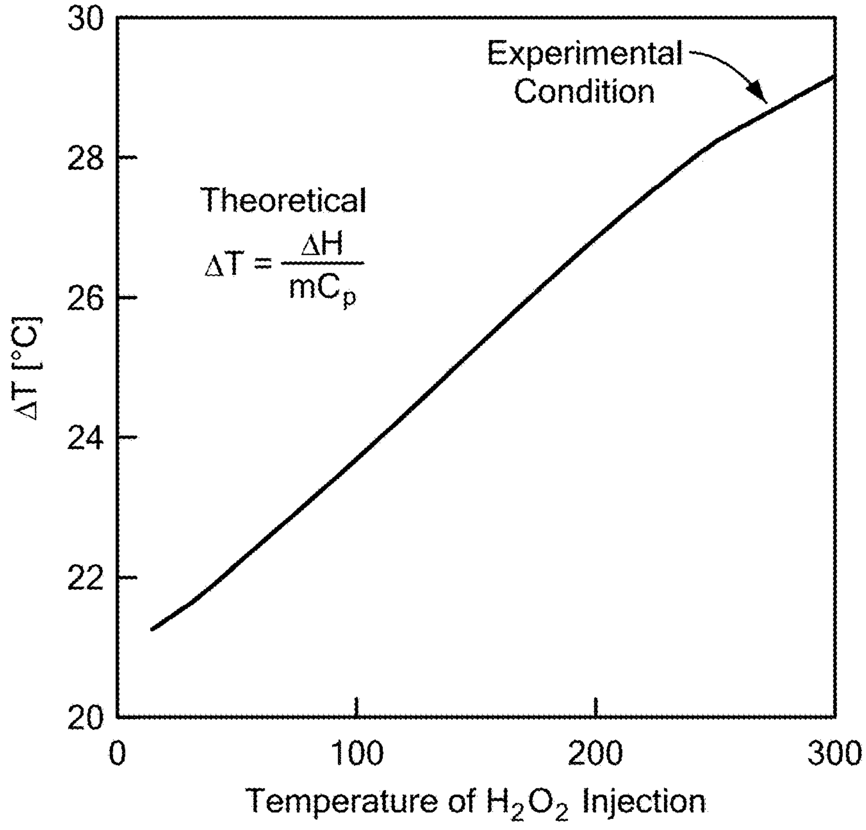

FIGS. 12A and 12B show temperature profiles of experimental conditions of the effect of the oxidant $H_2O_2$. FIG. 12A show a temperate trial upon introduction of $H_2O_2$, and FIG. 12B shows the theoretical rise. The temperature rise shows that $H_2O_2$ acts as an exotherm, and that this effect alone is insufficient to account for rise in oil yield.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for obtaining useful organic products from a waste stream, the method comprising:

adding an oxidant to the waste stream;

heating the waste stream under pressure to obtain at least two of: an oil, a gas, an aqueous mixture of oil and water, and char; and extracting the oil, filtering the char, and removing the aqueous mixture thereby obtaining useful organic products.

2. The method according to claim 1, wherein adding the oxidant further comprises adding the oxidant at a sub-stoichiometric amount.

3. The method of claim 2 wherein the sub-stoichiometric ratio is based on a stoichiometric ratio of oxygen in the oxidant and carbon in the waste stream, thereby limiting production of carbon dioxide.

4. The method of claim 2 further comprising:

determining a stoichiometric amount of oxygen for forming carbon dioxide with the carbon in the waste stream;

computing an oxygen quantity less than the determined stoichiometric amount for limiting the oxygen available for carbon dioxide production; and adding the oxidant in an amount for achieving the computed oxygen quantity.

5. The method of claim 2 wherein the sub-stoichiometric amount is based on limiting available oxygen for carbon dioxide production.

6. The method of claim 1 further comprising heating the waste stream for causing an autothermal reaction, the autothermal reaction resulting in a volumetric release of heat based on the reaction of the oxidant with the waste stream for increasing the heat.

7. The method according to claim 1 further comprising dissolving oil in acetone to separate oil from char.

8. The method according to claim 1 further comprising forming free radicals resulting from the heat and pressure applied to a containment of the waste stream for radical initiation.

9. The method of claim 1 further comprising heating the containment to between 250° C.-400° C. and maintaining the pressure between 10-35 MPa.

10. The method of claim 1 wherein the waste stream includes bio waste, the bio waste comprising non-edible plant matter.

11. The method of claim 1 wherein the waste stream includes sewage sludge resulting from municipal waste byproducts having greater than 50% carbon on a dry, ash-free basis.

12. The method of claim 1 wherein the waste stream includes polyethylene, polystyrene, and polypropylene.

13. The method of claim 1 wherein heating causes at least one of oxidation and radical initiation, the radical initiation based on free radicals formed from the heating and pressure in a containment around the waste stream.

14. The method of claim 1 wherein the oxidant contributes oxygen to reactions resulting in hydrocarbon chains.

15. The method of claim 1 further comprising adding or introducing free radicals for forming weak positions in hydrocarbon chains and forming short chained oxygenated molecules.

16. The method according to claim 1, wherein the oxidant is at least one selected from: hydrogen peroxide, perchloric acid, sodium perchlorate, and an organic hydroperoxide.

17. The method according to claim 16, wherein the organic hydroperoxide is of the formula R—O—O—R.

18. The method of claim 1 wherein the oil has at least 5% oxygen.

19. The method according to claim 1 further comprising upgrading the oil by hydrodeoxygenation.

20. A method for obtaining bio-oil from a waste stream including sewage sludge, the method comprising:

adding hydrogen peroxide to the waste stream in a sub-stoichiometric amount of 0.05-0.3 of complete conversion of available oxygen in the waste stream to carbon dioxide;

heating the waste stream to between 300° C.-325° C. in a containment under pressure of between 10-35 MPa to obtain an oil yield of at least 50% of the carbon in the waste stream; and extracting the oil and filtering residual char and aqueous mixtures thereby obtaining bio-oil.

* * * * *